United States Patent [19]
Javkin et al.

[11] Patent Number: 5,890,111
[45] Date of Patent: Mar. 30, 1999

[54] ENHANCEMENT OF ESOPHAGEAL SPEECH BY INJECTION NOISE REJECTION

[75] Inventors: Hector Raul Javkin, Goleta; Michael Galler, Santa Barbara; Nancy Niedzielski, Goleta, all of Calif.

[73] Assignee: Technology Research Association of Medical Welfare Apparatus, Tokyo, Japan

[21] Appl. No.: 773,638

[22] Filed: Dec. 24, 1996

[51] Int. Cl.⁶ .................................................. G10L 3/02
[52] U.S. Cl. .................. 704/226; 704/256; 704/203; 704/204; 606/204
[58] Field of Search .................... 704/226, 200, 704/208, 210, 233, 206, 207, 209, 203, 204, 215, 255, 256, 257; 381/70, 151

[56] References Cited

U.S. PATENT DOCUMENTS

| | | | |
|---|---|---|---|
| 4,308,861 | 1/1982 | Kelly | 606/204 |
| 4,439,872 | 4/1984 | Henley-Cohn et al. | 639/9 |
| 4,489,440 | 12/1984 | Chaoui | 381/70 |
| 4,502,150 | 2/1985 | Katz et al. | 381/70 |
| 4,589,136 | 5/1986 | Poldy et al. | 381/94.2 |
| 4,627,095 | 12/1986 | Thompson | 381/70 |
| 4,669,643 | 6/1987 | Ley | 224/257 |
| 4,718,099 | 1/1988 | Hotvet | 381/68.4 |
| 4,736,432 | 4/1988 | Cantrell | 381/83 |
| 4,837,832 | 6/1989 | Fanshel | 381/68.4 |
| 4,862,506 | 8/1989 | Landgarten et al. | 381/71.2 |
| 4,896,358 | 1/1990 | Bahler et al. | 704/257 |
| 5,123,922 | 6/1992 | Berg | 623/9 |
| 5,157,653 | 10/1992 | Genter | 370/288 |
| 5,326,349 | 7/1994 | Baraff | 623/9 |
| 5,359,663 | 10/1994 | Katz | 381/712 |
| 5,511,009 | 4/1996 | Pastor | 364/572 |
| 5,649,055 | 7/1997 | Gupta et al. | 704/210 X |
| 5,684,921 | 11/1997 | Bayya et al. | 704/210 X |
| 5,706,392 | 1/1998 | Goldberg et al. | 704/210 |

OTHER PUBLICATIONS

Thomas Parsons; Voice and Speech Processing; McGraw–Hill; p. 73, Jan. 1987.
Article by Frederick L. Jelinek, entitled "Continuous Speech Recognition by Statistical Methods" published Apr. 4, 1976, pp. 532–558, Proceedings of the IEEE, vol. 64, No. 4.

*Primary Examiner*—David R. Hudspeth
*Assistant Examiner*—Abul K. Azad
*Attorney, Agent, or Firm*—Price Gess & Ubell

[57] ABSTRACT

Injection noise and silence are detected in an input speech signal and an external amplifier is switched on or off based on the detected injection noise or silence. The input speech signal is digitized and a first copy of the digitized signal is preemphasized. After the input speech signal is preemphasized, a predetermined number of Mel-frequency cepstral coefficients (MFCCs) and difference cepstra are calculated for each window of the speech signal. A measure of signal energy and a measure of the rate of change of the signal energy is computed. A second copy of the digitized input speech signal is processed using amplitude summation or by differencing a center-clipped signal. The measures of signal energy, rate of change of the signal energy, the Mel coefficients, difference cepstra, and either the amplitude summation value or the differenced value are combined to form an observation vector. Hidden Markov Model (HMM) based decoding is used on the observation vector to detect the occurrence of injection noise or silence. A gain switch on an external speech amplifier is turned on after an occurrence of injection noise and remains on for the duration of speech and the amplifier is turned off when an occurrence of silence is detected.

22 Claims, 1 Drawing Sheet

ENHANCEMENT OF ESOPHAGEAL SPEECH BY INJECTION NOISE REJECTION

BACKGROUND OF THE INVENTION

1. Field of the Invention

The present invention relates generally to the field of esophageal speech, and more particularly, to a method for enhancing the clarity of esophageal speech.

2. Description of Related Art

Persons who have had laryngectomies (that is, a surgical removal of the larnyx, most often for treatment of laryngeal cancer) have several options for the restoration of speech, none of which have proven to be completely satisfactory. One relatively successful method, esophageal speech, requires speakers to insufflate, or inject air into the esophagus, thereby replacing the vibration that is normally created by the vocal cords within the larynx, with the vibration of the esophagus. This method is discussed in the article "Similarities Between Glossopharyngeal Breathing And Injection Methods of Air Intake for Esophageal Speech," Weinberg, B. & Bosna, J. F., *J. Speech Hear Disord,* 35:25–32, 1970, herein incorporated by reference. Esophageal speech is frequently accompanied by an undesired audible injection noise, sometimes referred to as an "injection gulp" or "clunk" which sounds similar to a belch. Not only is this sound unpleasant, but the undesirable effect of the injection gulp is magnified because esophageal speakers generally have low vocal intensity. In addition, for some speakers the injection noise can be mistaken for a speech segment which further diminishes the intelligibility of the speakers voice. A further discussion of these effects may be found in the article "A Comparative Acoustic Study of Normal, Esophageal, and Tracheoespphageal Speech Production, " Robbins, J., Fisher, H. B., Blom, E. C., and Singer, M. I., *J. Speech Hear Res,* 49:202–210, 1984, herein incorporated by reference.

Considerable work has been undertaken to enhance certain aspects of esophageal speech. Examples of these techniques are discussed in "Replacing Tracheoesophageal Voicing Sources Using LPC Synthesis, " Qi, Y., *J. Acoust. Soc. Am.,* 88:1228–1235, and in "Enhancement of Female Esophageal and Tracheoesophageal Speech," Qi, Y., Weinberg, B. and Bi, N., *J. Acoust. Soc. Am.,* 98:2461–2465, both herein incorporated by reference. Although considerable work has been done in improving esophageal speech, the problem of eliminating injection noise has not been successfully addressed. In addition, there is no device that both eliminates the injection noise, and enhances the voice quality of esphageal speakers.

SUMMARY OF THE INVENTION

The present invention eliminates the undesirable auditory effects associated with esophageal speech. Injection noise and silence are detected in an input speech signal, and an external amplifier is switched off when silence is detected, since silence precludes the clunk or gulp. The amplifier is switched on after the gulp or clunk to pass the semantically significant esophageal speech. The input speech signal is digitized and a first copy of the digitized signal is preemphasized. After the input speech signal is preemphasized, a predetermined number of Mel-frequency cepstral coefficients (MFCCs) and difference cepstra are calculated for each window of the speech signal. A measure of signal energy and a measure of the rate of change of the signal energy is computed. A second copy of the digitized input speech signal is processed using amplitude summation or by differencing a center-clipped signal. The measures of signal energy, rate of change of the signal energy, the Mel coefficients, difference cepstra, and either the amplitude summation value or the differenced value are combined to form an observation vector. Hidden Markov Model (HMM) based decoding is used on the observation vector to detect the occurrence of injection noise or silence. A gain switch on an external speech amplifier is turned on after injection noise has occurred and remains on for the duration of speech and the amplifier is turned off when an occurrence of silence is detected which precedes the injection noise or gulp.

BRIEF DESCRIPTION OF THE DRAWINGS

The exact nature of this invention, as well as its objects and advantages, will become readily apparent from consideration of the following specification as illustrated in the accompanying drawing, and wherein.

DESCRIPTION OF THE PREFERRED EMBODIMENTS

Figure 1:
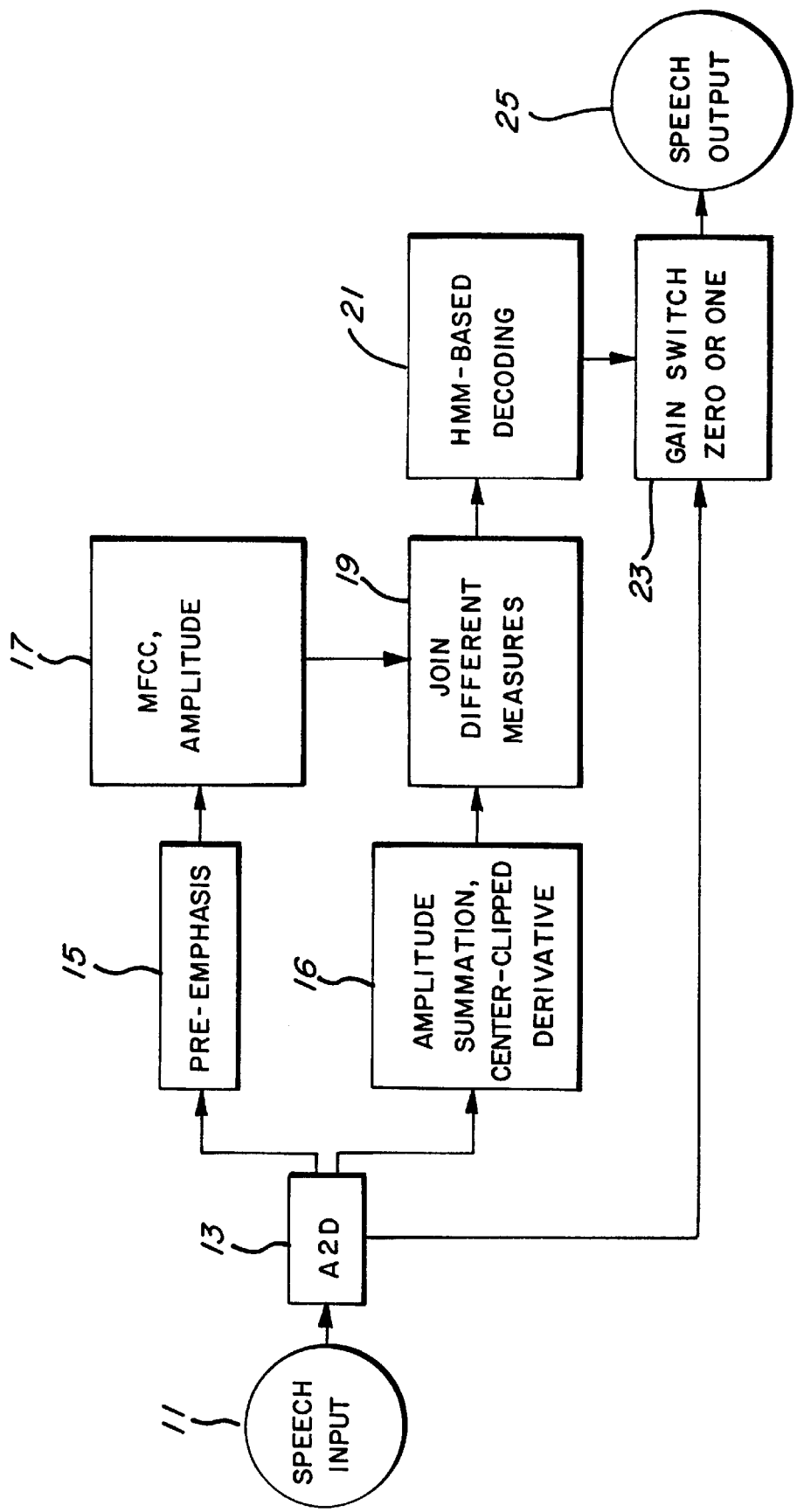
FIG. 1 is a block diagram of the method of the present invention.

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for rejecting injection noise based on the recognition of silence and injection gulps.

In esophageal speech, air injection is required prior to the start of every utterance and typically occurs after every pause before an utterance continues. By using speech recognition techniques to detect an injection gulp, it is possible to switch the external voice amplification apparatus on only after the injection noise has occurred, and switch amplification off after a period of silence. Normal speech is transmitted without interruption. This method results in real time amplification of the voice signal, without amplifying an injection gulp. The method of the present invention will now be described in detail with reference to FIG. 1.

A speaker's analog speech signal 11 is received, and the analog speech signal is digitized 13. Although, in the presently preferred embodiment the signal is digitized by sampling at 20 kHz, other sampling rates may be used. One copy of the digitized speech signal is preemphasized 15. Every 10 ms a 256-point Fast Fourier Transform (FFT) computation is performed on a 20-ms window of speech samples. After the signal is preemphasized, the first 12 Mel-frequency cepstral coefficients (MFCC) are calculated 17. The method of calculation of the MFCCs is well known in the art and are disclosed in the following references, which are incorporated here by reference: "Comparison of Parametric Representations for Monosyllabic Word Recognition in Continuously Spoken Sentences," Davis, S., and Mermelstein, P., IEEE Transactions ASSP 28, 357–366, 1980; "Optimal Feature Sets for Speaker Identification," Thompson, J., Master Thesis, EE Dept., University of Wales, Swansea, U.K., June 1993; and "A Comparative Study of Signal Representations and Classification Techniques for Speech Recognition, " Leung, H. C. , B. Chigier, and J. R. Glass, Proc. ICASSP-93, pp. II-680–II-683, 1993. These 12 MFCCs form the first part of the feature vector for a speech frame.

The first 12 MFCC spectral information is supplemented by additional information about the rate of change of spectral features, consisting of the derivatives, or difference cepstra. The combination of the first 12 MFCCs and the difference cepstra results in 24 Mel-based cepstral coefficients extracted from each window of the speech signal.

Time waveform analysis is used as well to further supplement the cepstral analysis. Specifically, a measure of signal energy is computed, along with the energy rate-of-change, based on a linear regression of nine successive samples. The speech vector is further augmented with two extra feature points based on the special characteristics of the injection noise. When a voice speech signal begins, it produces a negative air pressure pulse in the larynx. The injection noise, on the other hand, begins with a positive air pressure pulse in the larynx. The difference between the initial negative pressure pulse of speech and the initial positive pulse of the injection gulp is used to accoustically detect the injection gulp by electronic means well known in the art. A microphone, amplifiers, and an analog converter are used to provide a noninverted signal. The noninverted signal is produced either by utilizing an even number of inverting amplifiers or by testing for an inverted signal and adding an inverting amplifier if necessary.

The polarity difference between injection noise and speech may be detected by using Amplitude Summation (AS) 16. Amplitude Summation is a strong indicator of the onset of a gulp segment. Amplitude Summation, computed once per 20-ms speech window in the present embodiment, can be used to detect the initial deviation from zero of the speaker's signal. The digitized waveform is summed over intervals ranging from 1 to 20 milliseconds, depending on specific characteristics of individual speakers. The probability that an injection gulp has occurred is greater when a positive value over a given threshold occurs in the summed signal. This threshold can be adjusted, depending on the associated microphones and amplifiers used to record the signal.

A second measure for detecting the polarity is differencing the center-clipped signal. To remove low-amplitude ambient noise, the signal is center clipped. The remaining signal is then differenced, to obtain the first derivative, which is then smoothed with a running average. A positive value as a result, immediately following a zero value, tends to indicate the presence of injection noise, while a negative value tends to indicate the presence of speech.

The three measures of the rate of change, signal energy, and amplitude summation are added to the 24 Mel coefficients 19 to make up the complete observation vector. Thus, the acoustic front-end program creates a 27-entry observation vector to represent the features of each speech frame.

A Hidden Markov Model (HMM) based speech decoder 21 is used to find the optimal alignment of the speech signal with a set of speech tokens. Two different methods may be used to perform this decoding. In the first method, five speech tokens are used, including silence, gulp, noise1, noise2, and speech. In the second method, the speech token is replaced by a set of units representing the basic phonemes of the language. This second method has more discriminative power for increased accuracy, but requires more computation.

Each token is modeled with a data structure called a Hidden Markov Model (HMM), which is well known in the art and is described in the following references, which are incorporated here by reference: "An Inequality and Associated Maximization Technique in Statistical Estimation of Probabilistic Functions of Markov Processes," Baum, L. E., Inequalities 3:1–8, 1972; and "Statistical Modeling As a Means of Automatic Speech Recognition," Baker, J. K., PhD thesis, Computer Science Department, CMU, April 1975. Each HMM consists of a set of nodes and transitions. Associated with each transition is a probability, representing the likelihood of transition to the next node, and a probability density function, representing the feature distribution for one frame of speech in the corresponding stage of speech production. The probability density function (pdf) is a mixture of multivariate gaussian distributions. The number of nodes in the HMM units varies from three, in the case of simple models such as silence, to as many as seven for certain phonemes. The number of gaussian densities per mixture may be varied from 6 to 18 or more, depending on the limits placed on computation time in the application.

In one embodiment, five continuous mixture density Hidden Markov Models (HMMs) were trained on a subset of a corpus of esophageal speech data, segmented, and prelabeled by hand. The HMMs contained from three to seven states, with eight gaussian densities per mixture. The training procedure was initialized by training two models on an 8-kHz database of normal speakers: a speech model and a silence model. The distributions of these HMMs were then used to initialize the three other units. The five HMMs were then retrained on the training half of the esophageal speech signals for the speaker, resulting in a total of 42 recordings, using Beam-Welch reestimation. The speaker-adaptive training stage consisted of two iterations of segment-by-segment training and two iterations of nonsegment (i.e. embedded) training.

The HMM decoder program 21 decodes the speech signal frame synchronously, with a 10-ms advance rate. Each signal is processed by a front-end program into a vector of speech frames.

An efficient iterative procedure, the Viterbi algorithm, is used to estimate the desired probabilities. The Viterbi algorithm is described in "The Viterbi Algorithm," Forney, G. D., *Proceedings of the IEEE*, 16, 268–278, 1973, herein incorporated by reference. The decoding (i.e. recognition) problem is the search for the HMM unit-model sequence m which maximizes the probability $P(m|y=P(y|m)P(m)$. The Viterbi algorithm provides an efficient approximation. It is a dynamic programming algorithm to find the best path in a trellis of connected state/times, wherein the cost of a path at a given trellis mode $n(j)$ can be computed as the sum of the cost at the previous node $n(j-1)$ and the cost incurred to get from $n(j-1)$ to $n(j)$.

For each frame the algorithm examines each model node. By computing the distribution likelihood for a particular frame and multiplying the result by the score of the best incoming node times, the probability of a transition from that node, the new best path leading to the node in the frame under consideration is derived. When a better incoming path is found, this path is used to replace the score for the node under consideration. P(m) is factored in at transitions between models. In the simplest method described, these probabilities are uniformly 1. In the most detailed method, N-gram probabilities are used based on speech token sequence probabilities, e.g. bigrams and trigrams.

The classification method is achieved when, at the end of the forward processing of the speech frames, a best-scoring node distinguished as a token-final state has been identified. During the forward processing, the pointer to a previous node is stored every time the best incoming transition and path are identified for each node. These back-pointers may then be traced backward, along the way identifying the models to which they point, as well as the signal segment to which they correspond. At the model boundaries frame identifiers are output as segmentation data during the backtrack procedure. These frame identifiers explicitly divide the signal into segments corresponding to speech tokens.

Finally, those segments for which the insufflation (gulp) token have been labeled as output are classified as gulps within the speech signal. The esophageal speech is transmitted with a short delay to permit processing, and with amplification. When an injection gulp is detected, amplification is set to zero 23, so that the gulp is not transmitted, while the speech is transmitted normally 25 with the amplification set to one.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for rejecting injection noise (gulp) in a speech signal, wherein the injection noise is a result of using esophageal speech, the method comprising the steps of:
   processing the speech signal into pre-gulp silence, an injection noise segment and a following speech segment;
   detecting an occurrence of silence in the processed speech signal;
   blocking the speech signal after detecting the pre-gulp silence;
   detecting the injection noise segment in the proposed speech signal; and
   passing the speech signal following the injection noise.

2. The method of claim 1, wherein the step of processing the speech signal comprises the steps of:
   digitizing the speech input signal;
   obtaining a first copy of the digitized speech input signal;
   calculating a predetermined number of Mel frequency cepstral coefficients(MFCSs) and difference cepstra from the first copy of the digitized speech input signal;
   calculating a measure of signal energy and a measure of the rate of change of signal energy of the first copy of the digitized speech input signal;
   calculating an amplitude summation value for a second copy of the digitized speech input signal; and
   combining the Mel frequency cepstral coefficients, difference cepstra, signal energy and rate of change of signal energy measures, and the amplitude summation value to form an observation vector.

3. The method of claim 2, wherein the step of calculating an amplitude summation value is replaced by a step of calculating a difference value, the difference value calculated by center-clipping the second copy of the digitized speech input signal and then differencing and smoothing the center-clipped signal, and wherein the step of combining combines the difference value instead of the amplitude summation value.

4. The method of claim 2 wherein the step of detecting the injection noise segment in the processed speech signal comprises:
   performing Hidden Markov Model (HMM) based speech decoding on the observation vector.

5. The method of claim 4, wherein the step of performing Hidden Markov Model (HMM) based speech decoding on the observation vector comprises using 5 tokens, including silence, gulp, noise1, noise2, and speech.

6. The method of claim 4, wherein the step of performing Hidden Markov Model (HMM) based speech decoding on the observation vector comprises using basic phonemes of a speaker's language.

7. The method for rejecting injection noise (gulp) associated with esophageal speech, the method comprising the steps of:
   digitizing a speech input signal;
   obtaining a first copy of the digitized speech input signal;
   calculating a predetermined number of Mel frequency cepstral coefficients(MFCCs) and difference cepstra from the first copy of the digitized speech input signal;
   calculating a measure of signal energy and a measure of the rate of change of signal energy of the first copy of the digitized speech input signal;
   calculating an amplitude summation value for a second copy of the digitized speech input signal;
   combining the Mel frequency cepstral coefficients, difference cepstra, signal energy and rate of change of signal energy measures, and the amplitude summation value to form an observation vector;
   performing Hidden Markov Model (HMM) based speech decoding on the observation vector; and
   determining an injection noise signal based on the HMM based speech decoding and turning off an amplifier for a duration of the injection noise signal.

8. The method of claim 7, wherein the step of calculating an amplitude summation value is replaced by a step of calculating a difference value, the difference value calculated by center-clipping the second copy of the digitized speech input signal and then differencing and smoothing the center-clipped signal, and wherein the step of combining combines the difference value instead of the amplitude summation value.

9. The method of claim 7, wherein the step of digitizing a speech input signal comprises sampling the speech input signal at a sampling rate of 20 kilohertz (KHz).

10. The method of claim 9, wherein the step of preemphasizing a first copy of the digitized speech input signal comprises calculating a 256-point Fast Fourier Transform (FFT) every 10 milliseconds (ms) on a 20 millisecond (ms) window of speech samples.

11. The method of claim 10, wherein the step of calculating a predetermined number of Mel frequency cepstral coefficients(MFCCs) and difference cepstra from the first copy of the digitized speech input signal comprises calculating a first 12 Mel frequency cepstral coefficients and 12 difference cepstra.

12. The method of claim 11, wherein the step of calculating a measure of signal energy and a measure of the rate of change of signal energy of the first copy of the digitized speech input signal comprises calculating a linear regression of nine successive samples of the input speech signal.

13. The method of claim 12, wherein the step of calculating an amplitude summation value for a second copy of the digitized speech input signal comprises summing the digitized speech input signal over a time interval ranging from 1 to 20 milliseconds (ms), depending on characteristics of a speaker, once per 20 millisecond window of speech samples.

14. The method of claim 13, wherein the step of combining produces a 27 entry observation vector.

15. The method of claim 14, wherein the step of performing Hidden Markov Model (HMM) based speech decoding on the observation vector comprises using five tokens, including silence, gulp, noise1, noise2, and speech.

16. The method of claim 14, wherein the step of performing Hidden Markov Model (HMM) based speech decoding on the observation vector comprises using basic phonemes of a speaker's language.

17. The method of claim 15, wherein the amplifier is switched off when silence is detected and is switched on after the injection noise has occurred.

18. An apparatus for rejecting injection noise (gulp) in a speech signal produced by esophageal speech amplified by an external amplifier, the apparatus comprising:

processing means for processing the speech signal into pre-gulp silence, an injection noise segment, and a following speech segment;

detection means for detecting an occurrence of silence and a following injection noise segment; and switching means for switching off the external amplifier after an occurrence of silence and for switching on the external amplifier after an occurrence of injection noise.

19. The apparatus of claim 18, wherein the processing means for processing the speech signal further comprises:

digitized means for digitizing a speech input signal;

means for obtaining a first copy of the digitized speech input signal;

first calculating means for calculating a predetermined number of Mel frequency cepstral coefficients(MFCCs) and difference cepstra from the first copy of the digitized speech input signal;

second calculating means for calculating a measure of signal energy and a measure of the rate of change of signal energy of the first copy of the digitized speech input signal;

third calculating means for calculating an amplitude summation value for a second copy of the digitized speech input signal; and combining means for combining the Mel frequency cepstral coefficients, difference cepstra, signal energy and rate of change of signal energy measures, and the amplitude summation value to form an observation vector.

20. The apparatus of claim 19, wherein the third calculating means calculates a difference value, the difference value calculated by center-clipping the second copy of the digitized speech input signal and then differencing and smoothing the center-clipped signal, and wherein the combining means combines the difference value instead of the amplitude summation value.

21. The apparatus of claim 19, wherein the detection means further comprises:

Hidden Markov Model (HMM) speech decoding means for performing HMM based decoding on the observation vector.

22. A method for rejecting the injection noise (gulp) in a speech signal, wherein the injection noise is a result of using esophageal speech, the method comprising:

processing said the speech signal for Hidden Markov Model (HMM) speech recognition;

using HMM speech recognition to divide the signal into pre-gulp silence, an injection noise segment, and a following speech segment;

rejecting the injection noise by blocking the speech signal after the pre-gulp silence has been identified;

passing the speech signal by switching on an external amplifier after the injection noise has been identified.

* * * * *